UNITED STATES PATENT OFFICE.

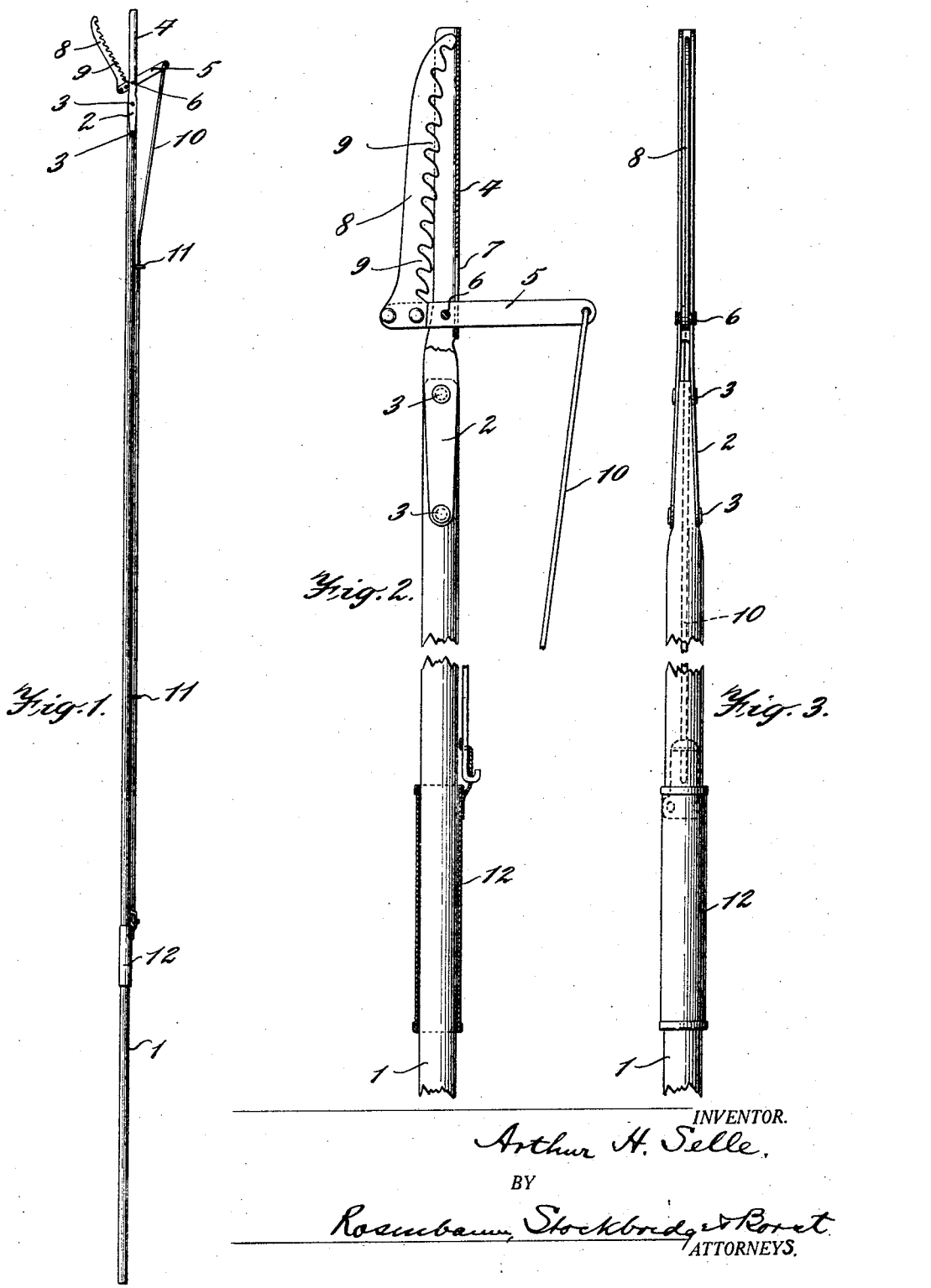

ARTHUR H. SELLE, OF PALATKA, FLORIDA.

MOSS PULLER.

1,403,574. Specification of Letters Patent. Patented Jan. 17, 1922.

Application filed June 25, 1920. Serial No. 391,803.

*To all whom it may concern:*

Be it known that I, ARTHUR H. SELLE, a citizen of the United States, residing at Palatka, in the county of Putnam and State of Florida, have invented certain new and useful Improvements in Moss Pullers, of which the following is a full, clear, and exact description.

This invention relates to devices for gathering the Spanish moss which grows in the branches of tropical trees, such as cypress and live oak trees, and hangs therefrom in long fibres. Heretofore attempts have been made to loosen this moss from the branches of the trees by cutting the same with knives which are carried upon a long pole, but this has been unsuccessful because the fibres are very tough and cannot be readily cut with knives in this manner. Other attempts have been made to loosen the moss by means of a pole having a hooking device upon the end thereof which is first twisted into the moss and then upon pulling of the hook the moss would be loosened from the trees. This has also been unsuccessful because the hooking device very frequently pulls out of the moss, instead of loosening it from the trees.

An object of my invention is therefore to provide a puller for moss which is not open to the above objections and which can be made to securely grip the moss, and after loosening it from the trees be made to readily release it.

A further object is to provide a device of this kind which is simple and inexpensive and which can be easily and rapidly operated.

Other objects and advantages will be apparent from the following description and the novel features of my invention will be particularly pointed out in the claims.

In the drawings:

Fig. 1 is an elevation of a puller which has been constructed in accordance with my invention;

Fig. 2 is an enlarged elevation of the same partly in section, and

Fig. 3 is a side elevation of the same.

In the illustrated embodiment, I provide a long pole 1 upon the upper end of which is secured my improved gripping means which comprises a pair of straps 2, which can be secured to the upper end of the pole by suitable means such as rivets 3, and having a channel-shaped extension 4. A right-angled gripping element 5 is pivoted to the channel extension 4, by pivot 6, with one arm of the gripping element 5 passing through an aperture 7 of the channel member. Another arm 8 of the gripping element extends generally in the same direction as the channel member and when the gripping element is rotated about its pivot 6 the arm 8 will enter the open side of the channel and grip the moss between the same and the interior of the channel. In order to prevent the moss from sliding out from between the channel member and arm 8 I provide that edge of the arm 8 which extends into the channel member with teeth 9, the under edges of which extend transversely of the arm 8, preferably either at right angles thereto or projecting slightly downwardly. The gripping element 5 is operated from the other end of the pole by means of a stiff but slightly flexible rod 10, which passes through guide eyelets 11 arranged along intermediate portions of the pole, and which couples into an operating sleeve 12 which slides upon the pole at the lower end thereof. In use, the operator carries the pole at the lower end with one hand and with the other hand engaging the slidable sleeve 12. By sliding the sleeve 12 upwardly upon the pole, the rod 10 which is attached thereto, will rotate the gripping element 5 about its pivot 6 and swing the arm 8 away from the channel member as indicated in Fig. 1. The pole is raised and the moss engaged between the arm 8 and the channel member, whereupon the sleeve 12 is pulled downwardly, and the rod 10 connected thereto will rotate the gripping element 5 to force the arm 8 toward and into the channel extension 4 and the moss fibres will be securely gripped between the arm 8 and the interior of the channel. The downwardly pointing teeth prevent the moss from sliding out when the pole is pulled so that the moss can readily be pulled loose from the branches of the trees. As soon as the moss has been thus loosened the sleeve 12 can be thrust upwardly which will cause the rotation of the arm 8 away from the channel extension 4 and the moss fibres will be released and allowed to drop to the ground. The moss can subsequently be gathered by other operators who follow along behind the operator with the puller. In this manner, I have provided a device which will grip the moss and securely hold the same during the operation of pulling to loosen it from the branches of the trees and which will readily release the same when the device is operated for that purpose.

It will be obvious that various changes in the details of construction herein described and illustrated may be made within the principle and scope of my invention.

I claim:

1. A moss puller comprising a pole, a channel member secured to one end of the pole, an angular clamping element having one arm pivoted to the channel member and having the other arm extending along the open face of the channel and movable into and out of the interior of the channel when rotated, said other arm having teeth upon that edge which moves into and out of the channel member for preventing the moss from sliding along the channel member when engaged between the latter and the clamping element, and means operable from the other end of the pole for rotating the element to grip or release the moss.

2. A moss puller comprising a pole, a channel member having straps extending from one end thereof, means for securing the straps to one end of the pole with the channel member forming an extension of the same, a bell crank pivoted to the channel member with one arm passing through the same and with another arm movable into and out of the open face of the channel member to grip moss therebetween, said last named arm having means for preventing slippage of the moss along the channel when the moss is clamped therein, and means connected to the first named arm and operable from adjacent the other end of the pole for clamping and releasing the moss.

3. A moss puller comprising a channel-like member, a clamping element mounted for movement into and out of the open face of the member, said element having upon the edge which passes into the channel member, a plurality of inwardly extending teeth for preventing sliding movement of the moss along the channel when the clamping element is within the member.

4. A moss puller comprising a channel-like member, a clamping element pivoted to the member for movement into and out of the interior of the channel and slightly spaced from the sides of the channel, said element having irregularities upon the edge facing the channel for preventing slippage of the moss along the channel member when the moss is engaged between the member and the element.

In witness whereof, I hereunto subscribe my signature.

ARTHUR H. SELLE.